Dec. 19, 1950     S. M. KASS     2,534,912
ADAPTER
Filed Oct. 4, 1948
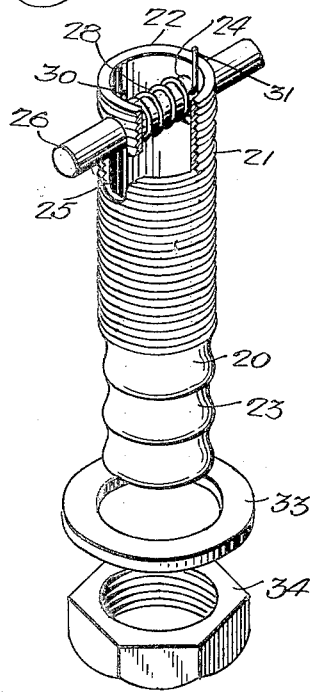
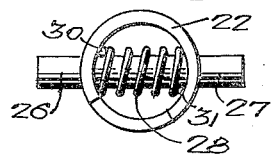
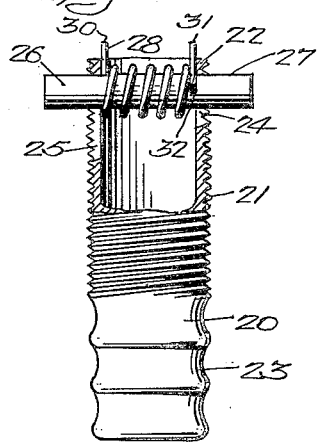
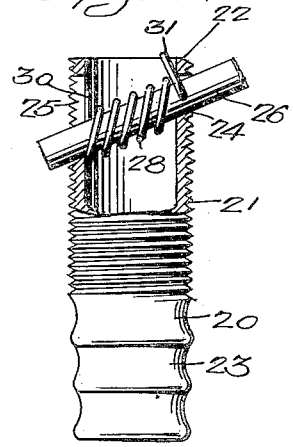
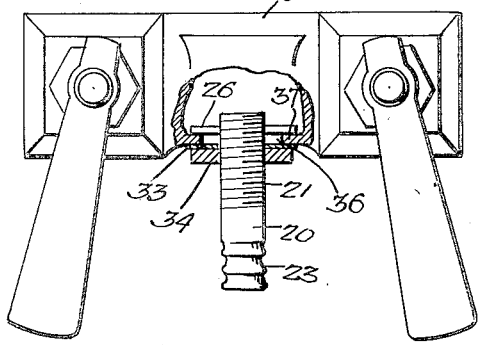
INVENTOR
Samuel M. Kass.
BY
ATTORNEYS Patented Dec. 19, 1950

2,534,912

UNITED STATES PATENT OFFICE 2,534,912

ADAPTER

Samuel M. Kass, Philadelphia, Pa.

Application October 4, 1948, Serial No. 52,696

2 Claims. (Cl. 285—44)

The present invention relates to adaptors for plumbing use, particularly intended to make hose connections to faucets and the like.

A purpose of the invention is to provide a simple and reliable means of attachment of a hose to a faucet or other fitting not provided with a normal hose connection.

A further purpose is to secure a transverse pin in openings across a pipe and to spring urge the pin toward equalized position, while permitting the pin to move endwise during insertion or removal.

A further purpose is to provide a hole at one side of the pipe and a slot at the other side of the pipe so that the pin will deflect longitudinally of the pin on the side having the hole and will swing or deflect angularly on the side having the slot.

Further purposes appear in the specification and in the claims.

In the drawings I have chosen to illustrate one only of the numerous embodiments in which the invention may appear, choosing the forms shown from the standpoints of convenience in illustration, satisfactory operation and clear demonstration of the principles involved.

Figure 1 is an exploded perspective, partially broken away, showing the complete adaptor.

Figure 2 is a top plan view of Figure 1.

Figure 3 is a side elevation partly in axial section, showing the pin in equalized position.

Figure 4 is a view corresponding to Figure 3, showing the pin rocked for insertion.

Figure 5 is a top plan view partly broken away to show the adaptor after attachment to a faucet.

Describing in illustration but not in limitation and referring to the drawings.

In the prior art it has often been difficult to make plumbing connections where no suitable threaded fitting is available, and numerous expedients have been adapted, often involving forcing a plug or the like into place and wiring or otherwise holding the plug in position.

The present invention is designed to simplify and cheapen the construction of adaptors especially intended for hose attachment to domestic water systems.

A short section of pipe 20, suitably in the form of a nipple, is desirably threaded externally at 21 from its interior or insertion end 22 to some point close to the hose attachment end. The pipe or nipple is desirably fluted at 23 at the outer end to assist in securing a hose in the conventional manner.

Near the insertion end at one side a hole 24 is drilled clear across and at the opposite side of the pipe the hole is extended toward the outer end to provide a longitudinal slot 25. Thus the pipe has in effect a hole clear across, supplemented by the portion of the slot which extends longitudinally toward the outer end.

A pin 26 extends clear across the pipe through the hole and slot and in equalized position as shown in Figure 3 projects at either side of the pipe as shown at 27.

A compression spring 28 surrounds the pin within the pipe, one end 30 being bent tangentially and engaging the interior of the pipe at the side toward the slot, and the other end 31 extending through a hole 32 in the pin to provide an anchor to the pin, and then being deflected tangentially to engage the pipe inside the hole 24. Thus regardless of how the pin may be deflected, the spring tends to return the pin to the equalized position shown in Figure 3.

A washer 33 is provided to seal the adaptor, and the washer is compressed by a nut 34 which engages the threads 21. The fluted portion 23 of the pipe is desirably small enough so that the nut can slip over for engagement on the threads.

As shown in Figure 5, a faucet 35 has a discharge opening 36 not provided with a hose connection. In order to insert the adaptor, the pin is first pushed by the finger on the side having the hole until the end of the pin at the side having the hole can pass behind the wall 37 of the faucet discharge opening. During this insertion the other end of the pin will be rocked in the slot as shown in Figure 4, and as soon as the end of the pin at the side toward the hole has slipped behind the wall 37, the action of the spring will tend to push it into the position of Figure 4, in which the pin projects out on the side toward the hole. The pipe will then be pushed further into the opening of the faucet or the like, if necessary pushing the end of the pin at the side toward the slot longitudinally of the pin so that it will clear the wall of the faucet. After this slot end of the pin has entered behind the wall 37 of the faucet, the spring will tend to restore the pin to the equalized position shown in Figure 3. This will be aided by pulling outwardly on the pipe. The pin will then extend transversely and be anchored inside the faucet. It is then merely necessary to apply the washer and nut to the outside of the faucet in order to lock the adaptor in place. A hose can then be secured to the adaptor.

If desired the washer and nut can be in place and the hose can be affixed before the adaptor is inserted.

Once the user becomes accustomed to the operation, the adaptor can be inserted very quickly.

For removal of the adaptor, the nut and washer are backed off, the adaptor is pushed inwardly, and then the pin on the side toward the slot is grasped, preferably by long-nosed pliers or a hook, rocking it to the position of Figure 4, and if necessary forcing it by a screw driver longitudinally until the end of the pin on the side toward the slot can pass beyond the wall 37. The pin is then pulled or pushed longitudinally so as to eliminate the extension beyond the pipe on the side toward the hole, at which point the pin can clear the wall 37 at that side and the adaptor can be completely removed.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A pipe adaptor comprising a pipe having near one end a hole extending clear across, a pin extending through the hole and extending beyond the pipe at each side when in equalized position and a spring secured to the pin within the pipe and urging the pin to equalized position.

2. In an adaptor, a pipe having a hole into the interior at one side near one end, having a slot opposite the hole at the other side of the pipe and extending longitudinally of the pipe toward the opposite end, and having a thread around the pipe toward the opposite end from the hole and slot, a pin extending across through the hole at one side and the slot at the other side and in equalized position extending beyond the pipe at each side, a spring surrounding the pin within the pipe, abutting against the pipe and anchored to the pin and a nut engaging the threads on the pipe.

SAMUEL M. KASS.

REFERENCES CITED

The following references are of record in the file of this patent:

UNITED STATES PATENTS

| Number | Name | Date |
|---|---|---|
| 621,108 | Leonard | Mar. 21, 1899 |
| 2,449,869 | Watson | Sept. 21, 1948 |